Nov. 13, 1962 T. BUDZICH 3,063,381
ENGINE
Filed Sept. 24, 1958 2 Sheets-Sheet 1

INVENTOR
Tadeusz Budzich
BY Dodge and Sons
ATTORNEYS

Nov. 13, 1962   T. BUDZICH   3,063,381
ENGINE
Filed Sept. 24, 1958   2 Sheets-Sheet 2

INVENTOR
Tadeusz Budzich

BY Dodge and Sons
ATTORNEYS

United States Patent Office 3,063,381
Patented Nov. 13, 1962

3,063,381
ENGINE
Tadeusz Budzich, Cleveland, Ohio, assignor to The New York Air Brake Company, a corporation of New Jersey
Filed Sept. 24, 1958, Ser. No. 763,101
1 Claim. (Cl. 103—162)

This invention relates to fluid pressure engines and more particularly to displacement controlling mechanism for such engines. While the invention can be used in various types of pumps and motors, it is especially suited to use in pumps of the rotary cylinder barrel longitudinally reciprocating piston type. For this reason, it will be described in relation to an engine of this kind.

In a common pump of this type, the pistons are moved on their discharge strokes by a cam plate which is journalled in the pump housing for angular adjustment about an axis which extends in a direction normal to and intersects the axis of rotation. The angular position of the cam plate relative to the axis of rotation determines the length of the piston strokes and therefore the displacement of the pump. The pump is provided with a spring which biases the cam plate toward its maximum stroke-establishing position, a piston motor for moving the cam plate toward its minimum stroke-establishing against the bias of the spring, and a control valve for varying the pressure in the motor in accordance with variations in pump discharge pressure. During operation, the cam plate remains in its maximum stroke-establishing position until discharge pressure reaches a predetermined value and then gradually moves toward the minimum stroke-establishing position as the dicharge pressure continues to increase above this value. Since the force exerted by the biasing spring increases as this movement proceeds, it is apparent that the final discharge pressure established by the control system will be greater than the predetermined value. For sensitive control action, it is essential that the pressure differential required to move the cam plate between its minimum and maximum stroke-establishing positions be as small as practicable. It is also essential that the cam plate move rapidly between these two positions.

The speed at which the cam plate moves, in shifting from its minimum to its maximum displacement-establishing position, depends on its acceleration and consequently on the force exerted by the spring. The control pressure differential, on the other hand, depends on the rate of the spring, i.e., the force required to deflect the spring one inch. In order to satisfy the speed and control pressure differential requirements, the spring must exert a large force and yet have a low rate. Since these are conflicting demands, the design of the spring involves a compromise. Theoretically this compromise can be avoided by increasing the free length of the spring, but as a practical matter this solution is unsatisfactory because a low rate spring having sufficient length to develop the required force would be unstable and would tend to buckle laterally when compressed. As a consequence, the reliability of the pump would be seriously impaired.

The object of this invention is to eliminate the compromise in the design of the biasing spring by providing a device for augmenting the spring bias and thus increasing the speed with which the cam plate moves without affecting the control pressure differential. Briefly, the invention consists in providing a fluid pressure motor having a working chamber which is in communication with the discharge passage and a movable motor element which is connected with the cam plate and arranged to bias it toward its maximum stroke-establishing position. This motor is so dimensioned that it develops an accelerating force sufficient to move the cam plate between its minimum and maximum stroke-establishing positions at the required speed. Since the motor performs a function previously assigned to the spring, the design compromise is eliminated and optimum control is realized.

In its preferred form, the stationary and movable elements of the motor are supported by the pump housing and the cam plate, respectively, for universal movement about points which lie on the longitudinal axis of the motor. Because of this arrangement, there is no bending load imposed on the motor, and consequently binding of the motor elements is prevented and friction between them is minimized. This feature increases the reliability of the control system and improves its response characteristics.

The preferred embodiment of the invention will now be described in relation to the accompanying drawings, in which.

Figure 1:
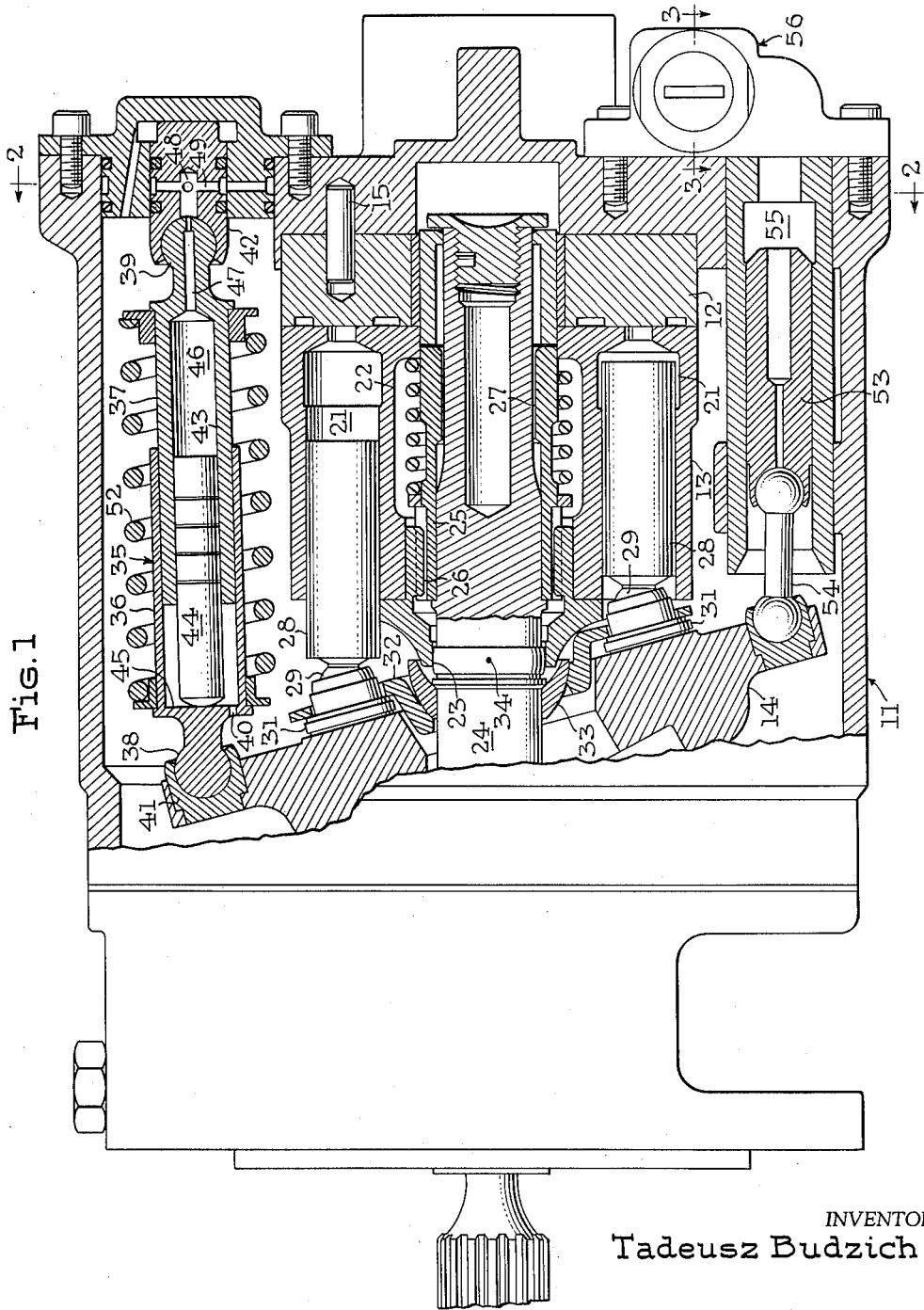
FIG. 1 is a partial axial sectional view of a rotary cylinder barrel pump incorporating the invention.
Figure 2:
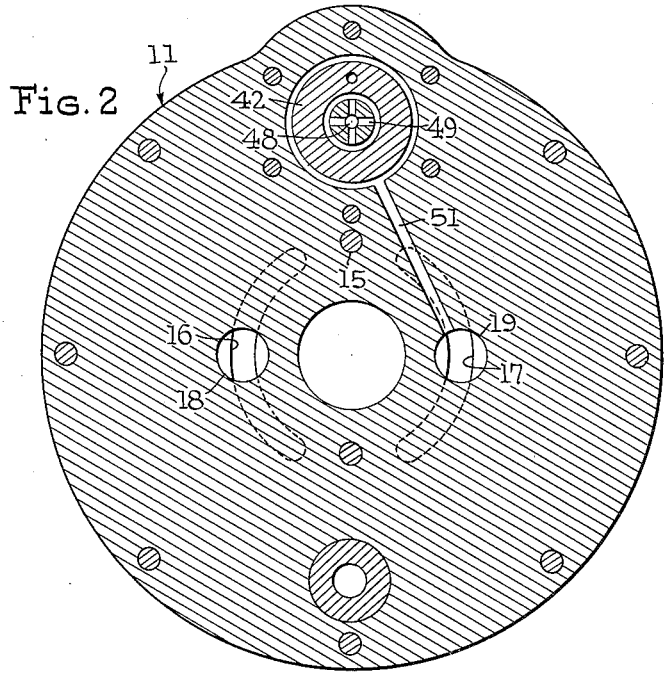
FIG. 2 is a sectional view taken on line 2—2 of FIG. 1.

As shown in the drawing, the pump comprises a housing 11 which is cored and bored to receive a valve plate 12, a rotary cylinder barrel 13, and an adjustable cam plate 14. The valve plate 12 is connected to the housing by pin 15 and contains arcuate inlet and discharge ports 16 and 17 which communicate, respectively, with the inlet and discharge passages 18 and 19. The cylinder barrel 13 contains a circular series of cylinder bores 21 which are so positioned that they communicate sequentially with the arcuate inlet and discharge ports 16 and 17 in valve plate 12 as the cylinder barrel rotates. An axial bore 22 extends through the cylinder barrel 13 and, at its left end, is in great circle engagement with spherical enlargement 23 carried by the drive shaft 24. The mating surfaces of the bore 22 and the enlargement 23 provide a universal and axially slidable support for the cylinder barrel 13. A torque tube 25, connected by splines 26 and 27 with the cylinder barrel 13 and the drive shaft 24, respectively, forms a driving connection between these two members. This feature of construction is fully described and claimed in applicant's copending application Serial No. 656,574, filed May 2, 1957, now Patent 2,905,046, granted February 16, 1960.

Pistons 28, carrying spherical heads 29 and shoes 31, are mounted in cylinder bores 21 for reciprocation by cam plate 14 and nutating plate 32. Nutating plate 32 is formed with a central spherical recess which seats on the spherical outer surface of a collar 33 carried by the shaft 24. The center of this spherical surface, as well as the center of spherical enlargement 23, is located at the point of intersection 34 of the axis of the drive shaft 24 and the plane of the centers of the spherical piston heads 29. The cam plate 14 is supported by yokes and trunnions (not shown) for angular adjustment about an axis extending in a direction normal to the axis of the drive shaft and intersecting that axis at a point slightly to the right of the point 34 as viewed in FIG 1. The methods of supporting the nutating plate and the cam plate are fully described and claimed in applicant's copending applications Serial Nos. 665,387 and 666,857, filed June 13, 1957, and June 20, 1957, respectively, now Patents 2,953,099 and 2,915,985, granted September 20, 1960, and December 8, 1959, respectively.

The cam plate 14 is biased toward its maximum stroke-establishing position (the position shown in FIG. 1) by the biasing motor 35. This motor comprises two telescoping cylinders 36 and 37 which, at their outer ends, are formed with spherical heads 38 and 39. These heads, which are centered on the longitudinal axis of the cylinders, are received in sockets 41 and 42 carried by the cam plate and the housing, respectively, and form universal connections between these members and the telescoping cylinders 36 and 37. A coaxial bore 43 is formed in the cylinder 37 for receiving the reciprocable piston 44. This piston is of such length that it abuts the wall 45 of cylinder 36 when the two cylinders are in their extended position. Vent passage 40 connects the interior of cylinder 56 with the interior of the pump housing. The working chamber 46 of the biasing motor is connected with the discharge passage 19 of the pump by a longitudinal passage 47 formed in the cylinder 37, longitudinal and radial passages 48 and 49 formed in the socket 42, and passage 51 formed in the housing 11. The restriction in longitudinal passage 47 provides damping which improves the stability of the control system. A spring 52, reacting between the telescoping cylinders 36 and 37, also serves to bias the cam plate 14 toward its maximum stroke-establishing position.

Although the cylinder 36 could itself function as the movable element of the biasing motor 35, the present embodiment is preferred because it permits the force exerted by the motor to be changed simply by varying the diameter of the piston 44 and its mating bore 43. Furthermore, since transverse couples acting on cylinders 36 and 37 (as a result of either the lack of squareness of the ends of spring 52 or of the frictional resistance between spherical heads 38 and 39 and sockets 41 and 42) are not transmitted to piston 44, they need not be considered when selecting the overlap and radial clearance between this piston and bore 43.

Figure 3:
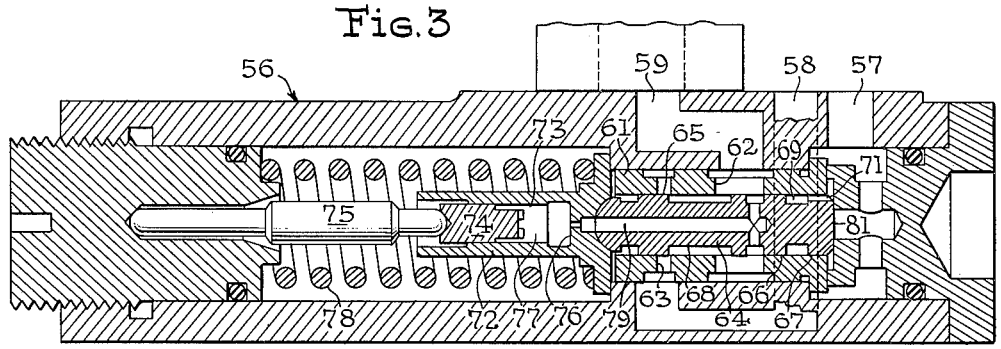
FIG. 3 is a sectional view of the control valve taken on line 3—3 of FIG. 1.

The lower end of cam plate 14, as viewed in FIG. 1, is universally connected with control motor piston 53 by connecting rod 54. The working chamber 55 of this motor communicates with the control valve 56. Referring to FIG. 3, control valve 56 comprises a housing having an inlet passage 57 connected with the discharge passage 19 of the pump, an exhaust passage 58 connected with the interior of the pump housing, and a motor passage 59 which is connected with the control motor working chamber 55. The valve housing contains a longitudinal bore having enlarged end portions which are closed and sealed by plugs, as shown, and an intermediate reduced diameter portion in which the valve sleeve 61 is located. Ports 62 and 63 are formed in the sleeve 61 and communicate, respectively, with motor passage 59 and exhaust passage 58. Mounted in the sleeve 61 is a slidable valve plunger 64 carrying annular lands 65, 66 and 67 which are separated by annular grooves 68 and 69. The land contains a longitudinal slot 71 for connecting the annular groove 69 with the inlet passage 57.

Seated on the left end of valve plunger 64 is a cylinder block 72 in which is formed a longitudinal cylinder bore 73. A slidable piston 74, seated on one of the spherical ends of a piston rod 75, is mounted in bore 73 and together with end wall 76 defines a motor working chamber 77. Surrounding piston rod 75 and cylinder block 72 is a spring 78 which reacts against the cylinder block and biases the valve plunger 64 to the right. A passage 79, extending through the valve plunger and the cylinder block, connects working chamber 77 with motor port 62. This control valve is more fully described and claimed in applicant's copending application Serial No. 685,530, filed September 23, 1957, now Patent 2,921,560, granted January 19, 1960.

*Operation*

When the pump is at rest, spring 78 biases control valve plunger 64 to the position shown in FIG. 3, thereby establishing communication between motor passage 59 and exhaust passage 58 through ports 62 and 63 and annular groove 68. This connection vents the control motor working chamber 55 and, as a result, allows spring 52 to move the cam plate 14 to its maximum stroke-establishing position. When the pump is running, discharge pressure in the passage 19 is transmitted to the working chamber 46 of the biasing motor where it acts against the right end of piston 44 and produces a force which maintains the cam plate 14 in its maximum stroke-establishing position. Discharge pressure is also transmitted to the inlet passage 57 of the control valve 56 where it acts against the surface 81 of land 67. As this pressure increases, valve plunger 64 moves to its lap position in which land 66 interrupts communication between ports 62 and 63. For convenience, the pressure required to hold the plunger in this position against the bias of spring 78 will be termed the reference pressure. A further increase in discharge pressure will move the plunger to a position in which the motor passage 59 and passage 79 are connected with inlet passage 57 via port 62, annular groove 69, and longitudinal slot 71. The pressures in working chambers 55 and 77 now increase and as they do, the force produced by the pressure in chamber 77 acting against end wall 76 plus the force of spring 78, will move the plunger 64 to the right toward its lap position. When the sum of these forces equals the force produced by the pressure in inlet passage 57 acting on the surface 81, the valve plunger 64 will be in its lap position. The pressure thus established in the control motor working chamber 55 equals the difference between the discharge pressure and the reference pressure multiplied by the ratio of the area of the surface 81 to the cross-sectional area of piston 74. After the pressure in working chamber 55 becomes large enough to overcome the combined bias of spring 52 and biasing motor 35, further increases in discharge pressure will cause the control motor piston 53 to move the cam plate 14 toward its minimum displacement-establishing position.

If, when the cam plate is in its minimum stroke-establishing position, the discharge pressure should suddenly decrease, control valve plunger 64 will shift to the right, thereby venting control motor working chamber 55 via passage 59, port 62, annular groove 68, port 63, and exhaust passage 58. Biasing motor 35 and spring 52 are thus permitted to move the cam plate rapidly toward its maximum stroke-establishing position.

The area of biasing motor piston 44 is so selected that a pressure in control motor working chamber 55 equal to one-half of the maximum allowable discharge pressure will hold the cam plate 14 in its minimum stroke-establishing position. This arrangement premits the cam plate to move at approximately the same speed in both stroke-changing directions. A numerical example of this operation will clearly illustrate the point. Let it be assumed that:

(1) The maximum allowable discharge perssure is 3000 p.s.i.;
(2) The control pressure differential of spring 52 is 30 p.s.i.;
(3) A control motor working chamber pressure of 1500 p.s.i. will hold the cam plate in its minimum stroke-establishing position; and
(4) The ratio of the area of face 81 to the area of end wall 76 is 1.

Using these values and remembering that the pressure established in working chamber 55 by the control valve 56 equals the difference between the discharge pressure and the reference pressure multiplied by the ratio of the area of the surface 81 to the area of piston 74, it is possible to calculate the reference pressure Y from the following equation:

$$(3000-Y) \times 1 = 1500$$

In this example, the reference pressure must be 1500 p.s.i. in order for the cam plate to reach its minimum displacement-establishing position at the same time the discharge pressure reaches 3000 p.s.i. This means that the motor working chamber 55 will be vented until discharge pressure reaces 1500 p.s.i. and that as the discharge pressure increases from this value to 2970 p.s.i., the pressure in this working chamber will gradually rise to 1470 p.s.i. With this pressure in the control motor working chamber 55 and a pressure of 2970 p.s.i. in biasing motor working chamber 46, the clockwise and counterclockwise moments acting on cam plate 14 will be equal. If the discharge pressure should now increase rapidly to 3000 p.s.i., fluid would be forced into the control motor working chamber 55 by a pressure differential of 1530 p.s.i. The pressure in control motor working chamber 55 will rise 30 p.s.i., and this will cause piston 53 to move the cam plate to its minimum stroke-establishing position. If the discharge pressure should now drop rapidly below 2970 p.s.i., control valve plunger 64 will shift to the right and fluid will be expelled from control motor working chamber 55 by a pressure differential of 1500 p.s.i. It is thus seen that within the control range, i.e., between 2970 p.s.i. and 3000 p.s.i., fluid will be forced into and out of the control motor working chamber 55 by approximately the same pressure head. As a result, the cam plate will move at approximately the same speed in both stroke changing directions.

It should be observed that since the centers of spherical heads 38 and 39 lie on the axis of cylinders 36 and 37 and piston 44, the force exerted by the biasing motor 35 acts along this axis. Because of this, there is no tendency for piston 44 or cylinder 36 to tilt relatively to cylinder 37. This arrangement has been found to be extremely satisfactory because it minimizes friction between these parts, and thus improves the response characteristics of the control system.

As stated previously, the drawings and description relate only to a preferred embodiment of the invention. Since many changes can be made in the structure of this embodiment without departing from the inventive concept, the following claim should provide the sole measure of the scope of the invention.

What is claimed is:

In a reciprocating piston engine of the type including a housing and an angularly adjustable cam plate for moving the pistons on their discharge strokes and for governing the length of these strokes, the improvement which comprises a biasing motor for urging the cam plate toward one of its limiting stroke-establishing positions and comprising two telescoping cylinders, means forming a universal connection between one cylinder and the housing, means forming a universal connection between the other cylinder and the cam plate, the points about which universal motions are afforded being on the axis of the two cylinders, a wall closing the outer end of the inner cylinder, a reaction surface located at the outer end of the outer cylinder and arranged symmetrically about the cylinder axis, and a piston slidable in the inner cylinder and having an inner end which cooperates with the wall to define a working chamber in the inner cylinder; a passage connected with the working chamber for transmitting pressure fluid thereto; a spring encircling the two cylinders and reacting between them for urging the cam plate toward said one limiting stroke-establishing position; and a control motor connected with the cam plate for moving it toward its other stroke-establishing position against the bias of the biasing motor and the spring.

References Cited in the file of this patent

UNITED STATES PATENTS

| | | |
|---|---|---|
| 1,945,391 | Benedek | Jan. 30, 1934 |
| 2,455,062 | Ifield | Nov. 30, 1948 |
| 2,556,979 | Purcell | June 12, 1951 |
| 2,587,182 | Livers | Feb. 26, 1952 |
| 2,604,047 | Beaman et al. | July 22, 1952 |

FOREIGN PATENTS

| | | |
|---|---|---|
| 140,930 | Australia | Apr. 23, 1951 |
| 355,646 | Great Britain | Aug. 18, 1931 |
| 594,060 | Great Britain | Oct. 31, 1947 |
| 783,619 | Great Britain | Sept. 25, 1957 |